Figure 1:
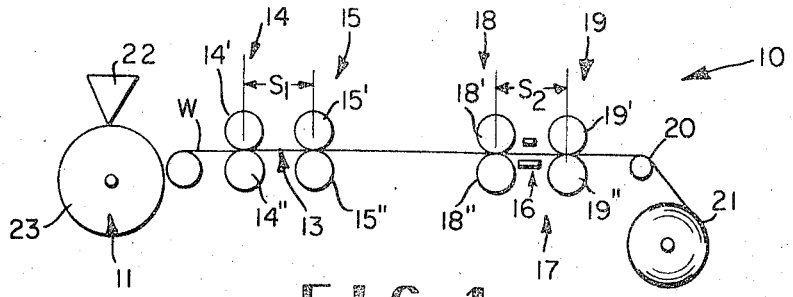
Figure 2:
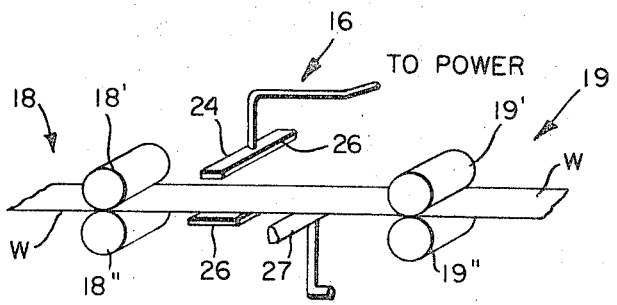
Figure 3:
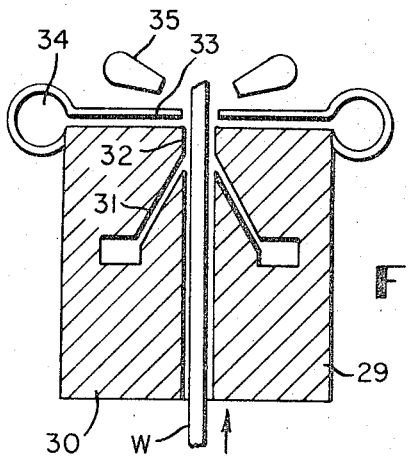
Figure 4:
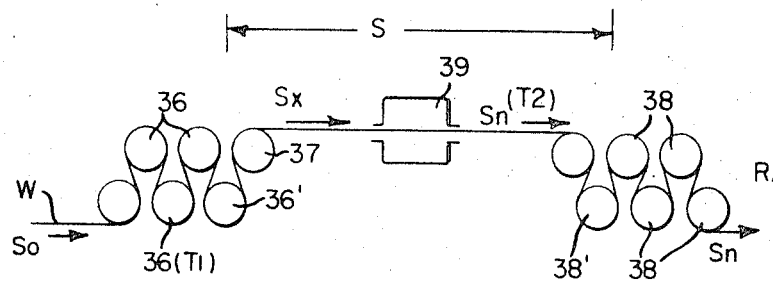
Figure 5:
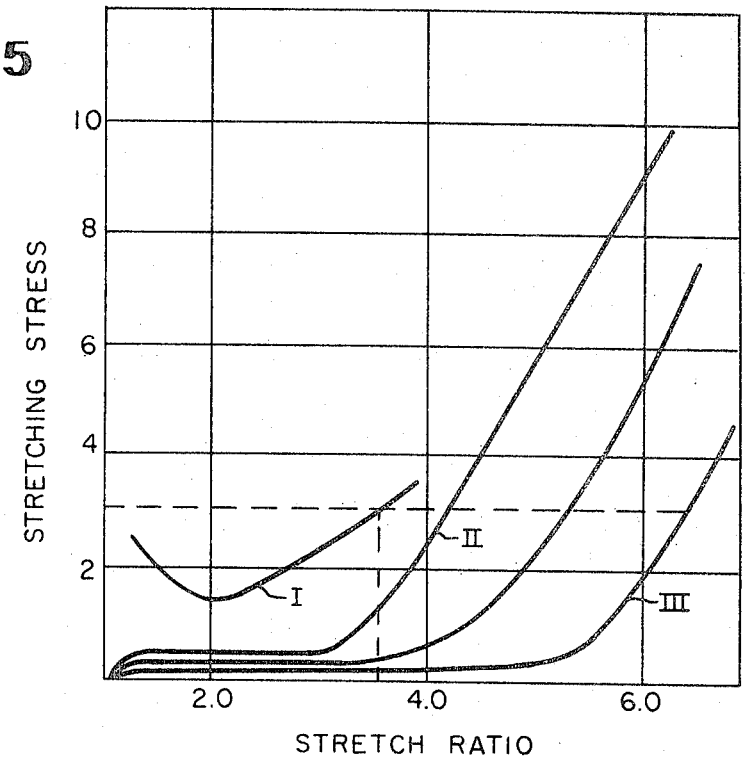
Figure 6:
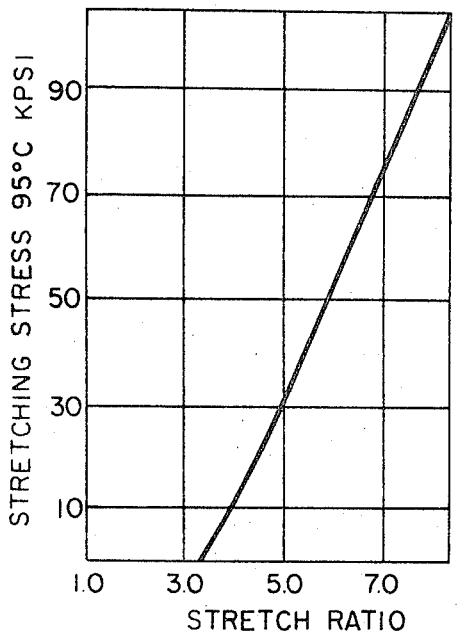
Figure 7:
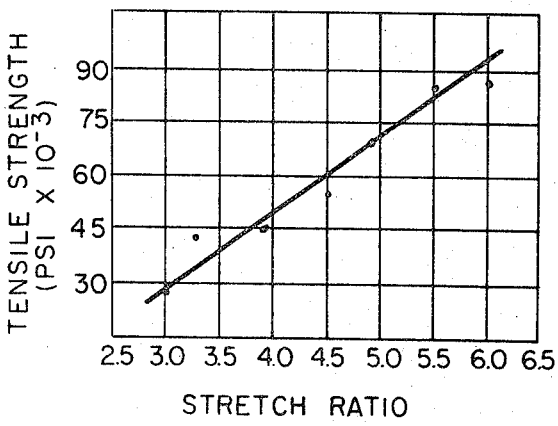

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 8, 1973

910 O.G. 409

T910,010

METHOD OF AND APPARATUS FOR ORIENTING POLYMERIC FILM

Randolph M. Clark, Circleville, Ohio, assignor to E. I. du Pont de Nemours and Company, Wilmington, Del.

Continuation of application Ser. No. 113,851, Feb. 9, 1971. This application July 12, 1972, Ser. No. 270,959

Int. Cl. B29d *7/24*

U.S. Cl. 264—210 R

2 Sheets Drawing. 7 Pages Specification

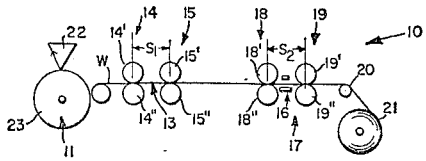

A method of orienting a web of polyethylene terephthalate film including the steps of:

casting a molten polymer and quickly quenching it to a temperature at or below its glass transition temperature to produce a web of substantially amorphous film;

first stretching the web of substantially amorphous film at a first stretching temperature between the glass transition temperature and approximately 10° C. above the glass transition temperature by application of a first stretching stress to the web in its direction of movement to partially orient and crystallize the web;

applying a second stretching stress to the partially oriented and crystallized web in the direction of movement thereof; and heating the web by noncontacting second heating means after application of the second stretching stress to a second stretching temperature substantially greater than 10°C. above the glass transition temperature to orient the web; and wherein the web of polyethylene terephthalate film is first stretched to between 1.5 and 4.0 times its initial dimension in the direction of movement at a stretching temperature from 80° C. to 90° C., and is then stretched in the same direction to a total up to 7.0 times at a temperature between 150° C. and just below the crystal melting point of the web.

METHOD OF AND APPARATUS FOR ORIENTING POLYMERIC FILM

Original Filed Feb. 9, 1971 2 Sheets-Sheet 1

INVENTOR
RANDOLPH M. CLARK

Hugo O. Sutteland
ATTORNEY

METHOD OF AND APPARATUS FOR ORIENTING POLYMERIC FILM

Original Filed Feb. 9, 1971 2 Sheets-Sheet 2

INVENTOR
RANDOLPH M. CLARK

BY Hugo O. Sutherland
ATTORNEY